US008460455B2

(12) United States Patent
Cho

(10) Patent No.: US 8,460,455 B2
(45) Date of Patent: Jun. 11, 2013

(54) AIR CLAY AND METHOD OF MANUFACTURING THE SAME

(75) Inventor: Jeong Yong Cho, Daejeon (KR)

(73) Assignee: MCA Sand Co., Ltd., Daejeon (KR)

( * ) Notice: Subject to any disclaimer, the term of this patent is extended or adjusted under 35 U.S.C. 154(b) by 826 days.

(21) Appl. No.: 12/606,866

(22) Filed: Oct. 27, 2009

(65) Prior Publication Data

US 2010/0083874 A1 Apr. 8, 2010

Related U.S. Application Data

(63) Continuation of application No. PCT/KR2008/004726, filed on Aug. 14, 2008.

(30) Foreign Application Priority Data

Aug. 16, 2007 (KR) .................. 10-2007-0082405

(51) Int. Cl.
*C01B 25/00* (2006.01)
*C08L 97/02* (2006.01)

(52) U.S. Cl.
USPC ................................ 106/287.26; 106/164.01

(58) Field of Classification Search
USPC ......................................... 106/287.26, 162.1
See application file for complete search history.

(56) References Cited

U.S. PATENT DOCUMENTS

| 2,763,561 | A | * | 9/1956 | Burney, Jr. et al. | 106/703 |
| 3,819,436 | A | | 6/1974 | Allen | |
| 3,824,107 | A | * | 7/1974 | Welant et al. | 106/805 |
| 5,711,795 | A | | 1/1998 | Browning | |
| 5,873,933 | A | | 2/1999 | Mackey | |
| 6,235,070 | B1 | | 5/2001 | Beermann | |
| 6,503,319 | B1 | * | 1/2003 | Courage et al. | 106/737 |

FOREIGN PATENT DOCUMENTS

| JP | 2008-063203 | * | 3/2008 |
| KR | 10-0231408 | | 8/1999 |
| KR | 10-2001-0049169 A | | 6/2001 |
| KR | 10-2004-0000361 A | | 1/2004 |
| KR | 10-2006-0011619 A | | 2/2006 |

OTHER PUBLICATIONS

International Search Report for International Application No. PCT/KR2008/004726 dated Feb. 24, 2009.

* cited by examiner

*Primary Examiner* — Shuangyi Abu Ali
(74) *Attorney, Agent, or Firm* — Susan Paik, Esq.

(57) ABSTRACT

An air clay and a method of manufacturing the same are disclosed. In one embodiment, the method includes i) selecting at least one raw material from a group consisting of sand powder, shell powder, crop powder and a mixture thereof, ii) finely grinding the raw material to prepare a base material having a particle diameter of about 0.02 mm to about 0.2 mm, iii) adding about 10 wt. parts to about 30 wt. parts of glycerin to about 100 wt. parts of the base material, iv) mixing and kneading these materials together to form a paste and v) adding about 0.1 wt. parts to about 9 wt. parts of a liquid coagulating agent for water treatment to the paste and mixing these materials together. According to one embodiment, the clay is useful for various types of play and learning for infants and young children.

12 Claims, 3 Drawing Sheets

AIR CLAY AND METHOD OF MANUFACTURING THE SAME

RELATED APPLICATIONS

This application is a continuation application, and claims the benefit under 35 U.S.C. §§120 and 365 of PCT Application No. PCT/KR2008/004726, filed on Aug. 14, 2008, which is hereby incorporated by reference. The PCT application also claimed priority to and the benefit of Korean Patent Application No. 10-2007-0082405 filed on Aug. 16, 2007 in the Korean Intellectual Property Office, which is incorporated herein by reference.

BACKGROUND OF THE INVENTION

1. Field of the Invention

The present invention relates to air clays useful for toy models for play and learning for infants and young children as well as fabrication of prototypes of articles, and a method of manufacturing the same.

2. Description of the Related Technology

Recently, many technologies and approaches have been disclosed regarding artificial sand and clay for indoor use to replace natural sand and clay. Such approaches include, for instance: Korean Patent No. 231,408 which introduced a modeling composition for handcrafts; Korean Laid-Open Application No. 2004-361 which reported a method for preparation of viscous sand and a three-dimensional (3-D) learning method using the same; U.S. Pat. No. 6,235,070 which disclosed viscous sand and a process for production thereof; Korean Patent No. 598,001 which described a sand based mixture and a method of preparing the same; U.S. Pat. No. 5,873,933 which reported a mixture of malleable play materials with a crumbly soil-like feel for infants and young children; and Korean Laid-Open Application No. 2006-11, 619 which proposed a naturally curable and functional clay emitting fragrance under pressure, etc.

Briefly, the modeling composition for handcrafts disclosed in Korean Patent No. 231,408 is produced by mixing water, salt, wheat flour, starch, stone powder, aluminum sulfate, oil, borax, magnesium chloride, sodium benzoate, titanium oxide and/or a dye together in desired mixing ratios, agitating and heating the mixture, and then, forming the mixture into a shaped product. This composition is easily kneaded into a paste using a small amount of water, advantageously has freezing resistance and controlled decay properties while maintaining a desired moisture content and favorable texture owing to addition of wheat flour and/or starch.

The viscous sand described in Korean Laid-Open Application No. 2004-361 which is used to repeatedly form a model and destroy the same by applying a desired force, is prepared by heating 80 to 90% by weight ("wt. %") of sand at 75 to 90° C., adding 0.5 to 3.5 wt. % of carnauba wax to the hot sand and mixing at the same temperature so as to completely melt the wax and coat the sand with the molten wax, adding 8 to 12 wt. % of beeswax and 1.5 to 4.5 wt. % of lanolin to the coated sand and mixing while maintaining a temperature of 55 to 70° C. so as to completely melt the beeswax and lanolin and again coat the sand with the molten beeswax and lanolin, and slowly cooling the treated sand.

The viscous sand described in U.S. Pat. No. 6,235,070 and the sand based mixture described in Korean Patent No. 598, 001 are common sand mixtures comprising sand particles and a binder, wherein the binder forms a coating on the sand particle and is at least one selected from a group consisting of beeswax, ceresin wax, microfine crystalline wax and a mixture of mineral wax and paraffin wax. This mixture may be used as a toy material, teaching material and/or construction material for architectural model design or landscape design especially for museums, aquariums, etc.

The mixture of malleable play materials with a crumbly soil-like feel disclosed in U.S. Pat. No. 5,873,933 generally includes a large amount of sand and an amorphous malleable binder, wherein the binder may include a soluble cellulose, polyvinyl alcohol, propyleneglycol, water, sodium borate, sodium carbonate, etc. The mixture exhibits a unique texture caused by the malleable binder combined with sand in large quantities as well as malleable and amorphous characteristics in a granular state.

Lastly, the artificial clay with natural curing properties and fragrance emitting function under pressure described in Korean Laid-Open Application No. 2006-11,619 is produced by combining polyvinyl alcohol and ethylene vinyl acetate as a base material with a filler including hollow type polyacrylonitrile powder having low specific density and heat expandable microspheres, adding a thickener, glycerin, a dry retarding agent (or a moisture retaining agent) and/or other additives to the combined mixture at room temperature, heating and mixing all of the materials together.

SUMMARY OF CERTAIN INVENTIVE ASPECTS

One aspect of the present invention is a novel clay having a unique textures and characteristics distinguished from those of conventional viscous sand or artificial clay.

Another aspect of the invention is a novel air clay capable of being used in a room, instead of general clay, sand or other materials including wax or paraffin-coated sand or clay, rubber clay (or silly putty), paper mache, etc., and also being repeatedly used without water.

Another aspect of the invention is a clay with unique characteristics in that the clay may be expanded and absorb air by stretching the same so as to become loose and fluffy like cloud, cotton or snow, while kneading and compressing the clay may release air and return the clay to a dense and hard condition.

Another aspect of the invention is an air clay which comprises: 100 parts by weight ("wt. parts") of a base material having a particle diameter of 0.02 to 0.2 mm prepared by selecting a raw material from a group consisting of sand powder, shell powder, crop powder and a mixture thereof and finely grinding the raw material; 10 to 30 wt. parts of glycerin; and 0.1 to 9 wt. parts of a liquid coagulating agent for water treatment.

Another aspect of the invention is a method for preparation of an air clay, comprising: selecting at least one raw material from a group consisting of sand powder, shell powder, crop powder and a mixture thereof, finely grinding the raw material to prepare a base material having a particle diameter of 0.02 to 0.2 mm, adding 10 to 30 wt. parts of glycerin to 100 wt. parts of the base material, and mixing and kneading these materials together to form a paste; and adding 0.1 to 9 wt. parts of a liquid coagulating agent for water treatment to the paste and mixing these materials together.

Another aspect of the invention is a method of manufacturing an air clay, comprising: selecting at least one raw material from a group consisting of sand powder, shell powder, crop powder and a mixture thereof; finely grinding the raw material to prepare a base material having a particle diameter of about 0.02 mm to about 0.2 mm; adding about 10 wt. parts to about 30 wt. parts of glycerin to about 100 wt. parts of the base material; mixing and kneading these materials together to form a paste; and adding about 0.1 wt. parts to about 9 wt. parts of a liquid coagulating agent for water treatment to the paste and mixing these materials together.

In the above method, the base material comprises sand powder. The above method further comprises: adding about 0.1 wt. parts to about 3 wt. parts of polyglutamic acid in a powder state after the addition of the coagulating agent for water treatment; and mixing the materials together.

Another aspect of the invention is an air clay comprising: about 100 wt. parts of a base material having a particle diameter of about 0.02 mm to about 0.2 mm formed from a raw material from a group consisting of sand powder, shell powder, crop powder and a mixture thereof; about 10 wt. parts to about 30 wt. parts of glycerin; and about wt. parts 0.1 to about 9 wt. parts of a liquid coagulating agent for water treatment, wherein the air clay is configured to absorb air and become loose and fluffy by stretching the same while the air clay releases air and returns to a dense and hard state by kneading and compressing the same.

In the above air clay, the base material is sand powder. The above air clay further comprises about 0.1 wt. parts to about 3 wt. parts of polyglutamic acid in a powder state. The above air clay further comprises a pigment.

Another aspect of the invention is an air clay manufactured by a method, wherein the method comprises: selecting at least one raw material from a group consisting of sand powder, shell powder, crop powder and a mixture thereof; finely grinding the raw material to prepare a base material having a particle diameter of about 0.02 mm to about 0.2 mm; adding about 10 wt. parts to about 30 wt. parts of glycerin to about 100 wt. parts of the base material; mixing and kneading these materials together to form a paste; and adding about 0.1 wt. parts to about 9 wt. parts of a liquid coagulating agent for water treatment to the paste and mixing these materials together.

DETAILED DESCRIPTION OF CERTAIN INVENTIVE EMBODIMENTS

Current viscous sand and artificial clay exhibit characteristics and appearances substantially similar to those of sand, wet sand or paraffin-coated oily sand, natural clay and the like commonly known in the art and have fundamental restrictions in that these materials require water for use thereof, are applied to limited types of modeling and/or are rapidly hardened, thus seldom attracting significant interest from infants and young children.

Hereinafter, embodiments of the present invention will be described in greater detail with reference to examples and drawings. However, these embodiments are given for the purpose of illustration and are not intended to limit the present invention.

Figure 1:
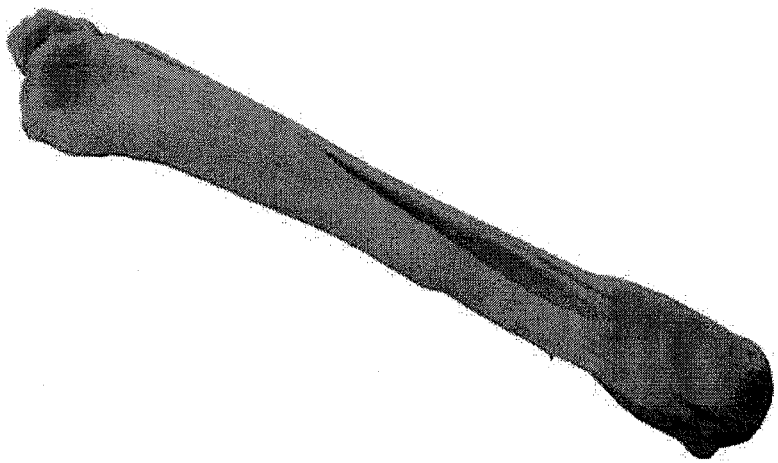
FIG. 1 is a photograph showing an air clay when stretched, according to one embodiment of the present invention.
Figure 2:
FIG. 2 is an enlarged photograph of the exemplary embodiment shown in FIG. 1, illustrating the air clay in a loose and/or fluffy state like cloud, cotton or snow, obtained by stretching the air clay to absorb air and to be expanded.
Figure 3:
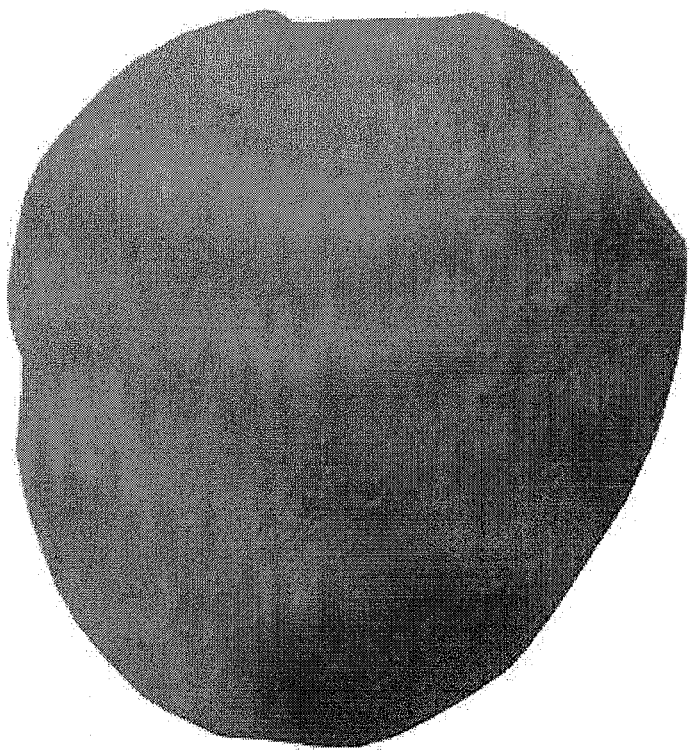
FIG. 3 is a photograph showing an air clay with air released there from by kneading and compressing the same, according to one embodiment of the present invention.
Figure 4:
FIG. 4 is a photograph showing an illustrative model fabricated using the air clay according to one embodiment of the present invention.

FIGS. 1 and 2 show an air clay according to one embodiment of the present invention in a loose and/or fluffy state like cloud, cotton or snow, obtained by stretching the air clay to absorb air and to be expanded. FIG. 3 shows air clay according to one embodiment of the present invention with air released there from by kneading and compressing the air clay like a typical clay or oily clay. FIG. 4 shows an illustrative model formed of the air clay according to one embodiment of the present invention.

In one embodiment, the air clay with a specific constitutional composition prepared by the method described above may absorb air in gaps formed between clay components by stretching the clay, which in turn, becomes loose and fluffy like cloud, cotton or snow (see FIG. 1). On the other hand, kneading and compressing the clay may release air and return the clay to a dense and hard condition (see FIG. 3). When repeating such stretching and conglomerating processes, the air clay may accept repetitive alteration in shape and/or physical properties caused by a physical phenomenon such that air passes through clay components. This characteristic of the air clay may be maintained semi-permanently, thus enabling the air clay not to be hardened and continuously used without addition of water.

In one embodiment, the air clay exhibits a unique texture, has controlled viscosity, degree of air absorption and/or texture depending on content of a coagulating agent, and contains glycerin to assist the air clay in maintaining a favorable viscosity and moisture content without addition of water. Briefly, a sand portion in the air clay may be in a powder state and directly absorbs glycerin, thus inhibiting separation of glycerin from the sand portion. Such characteristics of the air clay as described above demonstrate that the air clay is a novel type of clay having unique features clearly distinguishable from conventional materials including, for example, existing clays, artificial clays, artificial sands, oil clays and the like.

In one embodiment, the air clay includes: about 100 parts by weight ("wt. parts") of a base material having a particle diameter of about 0.02 mm to about 0.2 mm prepared by selecting a raw material from a group consisting of sand powder, shell powder, crop powder and a mixture thereof and finely grinding the raw material; about 10 to about 30 wt. parts of glycerin; and about 0.1 to about 9 wt. parts of a liquid coagulating agent for water treatment.

The clay described herein is referred to as "air clay" having properties which vary depending on the presence of air. The air clay can accept repetitive alteration in shape and/or physical properties, which is caused by a physical phenomenon such that air passes through clay components. Since this characteristic is maintained semi-permanently, the air clay may not be hardened and may be continuously used without adding water.

In one embodiment, a method of manufacturing the air clay includes: selecting at least one raw material from a group consisting of sand powder, shell powder, crop powder and a mixture thereof, finely grinding the raw material to prepare a base material having a particle diameter of about 0.02 to about 0.2 mm, adding about 10 to about 30 wt. parts of glycerin to about 100 wt. parts of the base material, and mixing and kneading these materials together to form a paste; and adding about 0.1 to about 9 wt. parts of a liquid coagulating agent for water treatment to the paste and mixing these materials together.

The base material may be selected from a group consisting of sand power, shell powder, crop powder and mixtures of at least two or more thereof. In one embodiment, the base material is obtained by finely grinding the selected material and has a particle diameter ranging from about 0.02 to about 0.2 mm (corresponding to about 100 to about 60 mesh). The above range of the particle may provide a completely uniform phase in a mixed paste that comprises glycerin as well as the base material. However, other ranges may also be used.

When stretching the air clay, a glycerin portion may be separated from the base material and stretched while the base material portion remains. The base material may include sand powder alone or a combination of sand powder with other materials such as shell powder, crop powder, etc. The sand powder may include natural or artificial sand and be prepared by screening the natural or artificial sand through a sieve having a desired mesh size or finely grinding the same, so as to have a desired particle diameter as defined above.

Glycerin is another component other than the base material. about 10 to about 30 wt. parts of glycerin is added to about 100 wt. parts of the base material, followed by thoroughly mixing and kneading the base material and glycerin so as to form a completely uniform phase.

A coagulating agent for water treatment may expand a glycerin portion and ensure that the base material and glycerin continuously maintain a uniform phase. The coagulating agent may comprise typical coagulating agents commonly used in water treatment including waste water treatment including, for example, inorganic coagulants such as aluminum sulfate, or anionic and/or cationic organic polymer coagulants. The coagulating agent may be an anionic or cationic organic polymer coagulant. In exemplary embodiments of the present invention, "HA-711" available from Hansol Chemical Co., Ltd. as one of the anionic coagulants was used. The coagulating agent for water treatment is generally prepared in a powder, liquid or emulsion state and used as a diluted solution in water. In general, anionic and non-ionic coagulants are diluted to about 0.5%, a cationic coagulant is diluted to about 0.5 to about 1% and an emulsion type coagulating agent is diluted to about 0.2 to about 0.5% in a solvent. "A coagulating agent for water treatment" used herein means a diluted coagulating agent for use unless it is particularly defined or limited. According to one embodiment of the present invention, the diluted coagulating agent for water treatment is added in an amount of about 1 to about 9 wt. parts to 100 wt. parts of the base material. As a crude coagulating agent (an undiluted powder), the amount of the coagulating agent may range from about 0.001 to about 0.09 wt. parts.

The air clay may further include any natural polymer coagulant for controlling stickiness (especially where the air clay sticks to fingers or hands of a child during play) and viscosity. The natural polymer coagulant may be in a powder state such that the air clay has controlled viscosity by spraying the coagulant powder over the air clay during a final process in manufacture thereof. For example, polyglutamic acid in a powder state, PG21Ca (manufactured by Nippon Poly-Gulu and available from Korea Poly-Gulu) as the natural polymer coagulant is added in an amount of about 0.1 to about 3 wt. parts to about 100 wt. parts of the base material.

The air clay may optionally include other additives such as fragrances, pigments, etc. For pigments, especially aqueous pigments, fluorescent or photo-luminescent pigments, or pigments with colors varied by temperature and light may be used. For fragrances, natural flavors such as herb powder may be used. Moreover, a deodorant such as charcoal powder may be also added. An amount of such an additive to be added may be less than about 1% of the total weight of the air clay.

Examples 1 to 8

(1) Firstly, each of base materials was selected and finely ground to form a fine powder having a particle diameter listed in the following Table 1;

(2) Glycerin was added to the prepared base material in a ratio by weight listed in Table 1, followed by sufficiently mixing and kneading the mixture;

(3) A liquid coagulating agent for water treatment was added to the kneaded paste obtained from step (2) in a ratio by weight listed in Table 1; and (4) A natural coagulant was sprayed over the mixture obtained from step (3) to control viscosity of the resulting air clay.

Comparative Example 1

An air clay was prepared by the same procedure as described in Example 1 except that 4 wt. parts of a powdered natural coagulant were added to 100 wt. parts of a base material.

TABLE 1

| Section | Base material | Glycerin | Coagulating agent for water treatment (HA-711) | Powdered natural coagulant (polyglutamic acid) | Features and uses |
|---|---|---|---|---|---|
| Example 1 | Sand powder, particle diameter 0.2 mm, 100 g | 10 g | 3 g | PG21Ca 0.5 g | Air absorption and release in large quantities, smooth deformation by stretching and compressing the clay, high viscosity Use: touch and feel play |
| Example 2 | Sand powder, particle diameter 0.1 mm, 100 g | 15 g | 3 g | PG21Ca 1 g | Viscosity higher than that of the product in Example 1, less smooth deformation but softer texture than those of the product in Example 1 Use: play dough |
| Example 3 | Sand powder, particle diameter 0.05 mm, 100 g | 20 g | 2 g | PG21Ca 2 g | Viscosity higher than that of the product in Example 2, less smooth deformation but softer texture than those of the product in Example 2 Use: modeling |
| Example 4 | Sand powder, particle diameter 0.02 mm, 100 g | 25 g | 1 g | PG21Ca 3 g | Viscosity higher than that of the product in Example 3, less smooth deformation but softer texture than those of the product in Example 3 Use: sculpting |
| Example 5 | Same as Example 2 except for using shell powder instead of sand powder | | | | Generally similar to sand powder but with a lighter feel |

TABLE 1-continued

| Section | Base material | Glycerin | Coagulating agent for water treatment (HA-711) | Powdered natural coagulant (polyglutamic acid) | Features and uses |
|---|---|---|---|---|---|
| Example 6 | | A mixture of products from Examples 1 and 4 in a ratio of 50:50 | | | Generally similar Physical properties but smooth deformation differences between products of Examples 6, 7 and 8 |
| Example 7 | | A mixture of products from Examples 1 and 3 in a ratio of 50:50 | | | |
| Example 8 | | A mixture of products from Examples 1 and 2 in a ratio of 50:50 | | | |
| Comparative example 1 | | 4 g of powdered natural coagulant (substantially no air absorption and release, returning to original conditions like natural soil) | | | Suitable for play of artificial soil |

The air clay according to at least one embodiment of the present invention has physical properties remarkably distinguished from those of existing clay, viscous sand, silly putty, etc., which are sufficient to satisfy need-for-touch of infants and young children, and is readily deformed and/or modified so that it may be used as a functional clay for various types of play and learning for infants and young children, instead of existing clay, paper mache, sand, artificial sand and so on. In addition, adding a pigment to the air clay may simply and rapidly impart a variety of colors thereto, thereby being utilized in a number of applications, especially, for fabrication of prototypes.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of manufacturing an air clay, comprising:
   selecting at least one raw material from a group consisting of sand powder, shell powder, crop powder and a mixture thereof;
   finely grinding the raw material to prepare a base material having a particle diameter of about 0.02 mm to about 0.2 mm;
   adding about 10 wt. parts to about 30 wt. parts of glycerin to about 100 wt. parts of the base material;
   mixing and kneading these materials together to form a paste; and
   adding about 0.1 wt. parts to about 9 wt. parts of a liquid coagulating agent for water treatment to the paste and mixing these materials together, wherein the air clay is configured to absorb air and become loose and fluffy by stretching the air clay while the air clay releases air and returns to a dense and hard state by kneading and compressing the air clay.

2. The method according to claim 1, wherein the base material comprises sand powder.

3. The method according to claim 2, further comprising:
   adding about 0.1 wt. parts to about 3 wt. parts of polyglutamic acid in a powder state after the addition of the coagulating agent for water treatment; and
   mixing the materials together.

4. The method according to claim 2, further comprising adding a pigment to the mixture.

5. The method according to claim 1, further comprising:
   adding about 0.1 wt. parts to about 3 wt. parts of polyglutamic acid in a powder state after the addition of the coagulating agent for water treatment; and
   mixing the materials together.

6. The method according to claim 1, further comprising adding a pigment to the mixture.

7. An air clay comprising:
   about 100 wt. parts of a base material having a particle diameter of about 0.02 mm to about 0.2 mm formed from a raw material from a group consisting of sand powder, shell powder, crop powder and a mixture thereof;
   about 10 wt. parts to about 30 wt. parts of glycerin; and
   about wt. parts 0.1 to about 9 wt. parts of a liquid coagulating agent for water treatment, wherein the air clay is configured to absorb air and become loose and fluffy by stretching the air clay while the air clay releases air and returns to a dense and hard state by kneading and compressing the air clay.

8. The air clay according to claim 7, wherein the base material is sand powder.

9. The air clay according to claim 8, further comprising about 0.1 wt. parts to about 3 wt. parts of polyglutamic acid in a powder state.

10. The air clay according to claim 8, further comprising a pigment.

11. The air clay according to claim 7, further comprising about 0.1 wt. parts to about 3 wt. parts of polyglutamic acid in a powder state.

12. The air clay according to claim 7, further comprising a pigment.

* * * * *